(12) United States Patent
Nemoto et al.

(10) Patent No.: US 7,076,148 B2
(45) Date of Patent: Jul. 11, 2006

(54) LIGHT GUIDE, LINE-ILLUMINATING DEVICE, AND IMAGE-SCANNING DEVICE

(75) Inventors: Hiroyuki Nemoto, Tokyo (JP); Hirohiko Iwase, Tokyo (JP); Hidemitsu Takeuchi, Tokyo (JP); Takashi Kishimoto, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 11/137,692

(22) Filed: May 25, 2005

(65) Prior Publication Data

US 2005/0265684 A1 Dec. 1, 2005

(30) Foreign Application Priority Data

May 26, 2004 (JP) ............................. 2004-156305

(51) Int. Cl.
*G02B 6/00* (2006.01)
(52) U.S. Cl. .................... 385/147; 385/901; 362/610
(58) Field of Classification Search ............... 385/146, 385/901, 147; 362/610
See application file for complete search history.

(56) References Cited

U.S. PATENT DOCUMENTS

| 5,655,827 | A  | * | 8/1997 | Kaneko et al. | ............. 362/613 |
| 5,838,403 | A  | * | 11/1998 | Jannson et al. | ................ 349/65 |
| 5,838,404 | A  | * | 11/1998 | Ozeki et al. | ................... 349/65 |
| 5,999,685 | A  | * | 12/1999 | Goto et al. | .................. 385/146 |
| 6,259,082 | B1 | * | 7/2001 | Fujimoto et al. | ......... 250/208.1 |
| 6,305,811 | B1 | * | 10/2001 | Beeson et al. | .............. 362/626 |
| 6,480,307 | B1 | * | 11/2002 | Yang | ............................. 359/15 |
| 6,585,356 | B1 | * | 7/2003 | Ohkawa | ........................ 347/65 |
| 6,612,730 | B1 | * | 9/2003 | Ikeda | .......................... 362/558 |
| 6,744,033 | B1 | * | 6/2004 | Ikeda | .......................... 250/216 |
| 6,767,105 | B1 | * | 7/2004 | Nakahashi et al. | ........... 362/27 |
| 6,798,574 | B1 | * | 9/2004 | Kim | ............................. 359/566 |
| 6,808,280 | B1 | * | 10/2004 | Uemura et al. | ............. 362/604 |
| 6,845,212 | B1 | * | 1/2005 | Gardiner et al. | ............ 385/146 |

FOREIGN PATENT DOCUMENTS

| JP | 08-163320 | 6/1996 |
| JP | 10-126581 | 5/1998 |
| JP | 2001-242322 | 9/2001 |

* cited by examiner

*Primary Examiner*—John D. Lee
*Assistant Examiner*—Rhonda S. Peace
(74) *Attorney, Agent, or Firm*—Carrier, Blackman & Associates, P.C.; Joseph P. Carrier; William D. Blackman (57) ABSTRACT

A light guide, a line-illuminating device, and an image-scanning device are provided which are excellent in uniformity of the light amount. A light-reflecting portion comprised of tubular concave surfaces becomes a reflecting surface having tubular convex surfaces when seen from the inside of the light guide. With such structure, even when the incident angle of light from a light source unit slightly displaces, the reflection angle in the tubular convex surfaces significantly changes. In an irregular surface having a triangular shape, as in a conventional example, the incident angle becomes almost uniform in the area far from the light source unit, and thereby the reflection angle also becomes uniform. Consequently, it is difficult to achieve uniform reflection in the main-scanning direction. However, with the tubular concave surfaces, light is reflected uniformly toward the upper surface as a light-emitting surface.

20 Claims, 6 Drawing Sheets

LIGHT GUIDE, LINE-ILLUMINATING DEVICE, AND IMAGE-SCANNING DEVICE

BACKGROUND OF THE INVENTION

1. Field of the Invention

The present invention relates to a light guide, a line-illuminating device, and a contact-type or reduction-type image-scanning device (image sensor) in which the line-illuminating device is incorporated.

2. Description of the Background Art

An image-scanning device for a facsimile machine, a copying machine, an image scanner or the like is provided with a line-illuminating device for linearly illuminating a document surface along a main scanning field. In the line-illuminating device, light is introduced into an end surface of a bar-shaped or plate-shaped transparent light guide, reflected on the internal surfaces, and emitted from a light-emitting surface.

Since a light-emitting element such as an LED is provided on one end or both ends of the light guide of the line-illuminating device, the amount of emitted light is greater toward the end, and the light intensity is non-uniform in the main-scanning direction.

Thus, Patent Document 1 has proposed that a light scattering pattern is formed on a surface of the light guide by printing white pigment, and the width of the light scattering pattern is gradually decreased toward the light-emitting unit. Also, Patent Document 2 has proposed that a light scattering pattern formed on the end near to the light-emitting unit is a discontinuous shape.

However, since a light scattering pattern is formed by printing white pigment with a screen printing method in the above-mentioned cases, the magnitude of transfer dots is varied due to many factors such as clogging of the screen, the temperature, the humidity, the dilution degree of the solvent, or diffusion of the pigment by static electricity, whereby a preferable light scattering pattern cannot be reproduced and the production yield is deteriorated. If a silk-screen printing method is used, since correction and production need to be repeated until satisfactory uniformity is achieved, it takes a lot of time and money.

In order to solve the above-mentioned drawbacks, Patent Document 3 has proposed that a light-reflecting portion comprised of an irregular surface having a triangular shape is provided in the rear surface (bottom surface) of the light guide.

[Patent Document 1] Japanese Patent Application Publication No. 8-163320

[Patent Document 2] Japanese Patent Application Publication No. 10-126581

[Patent Document 3] Japanese Patent Application Publication No. 2001-242322

Figure 12:
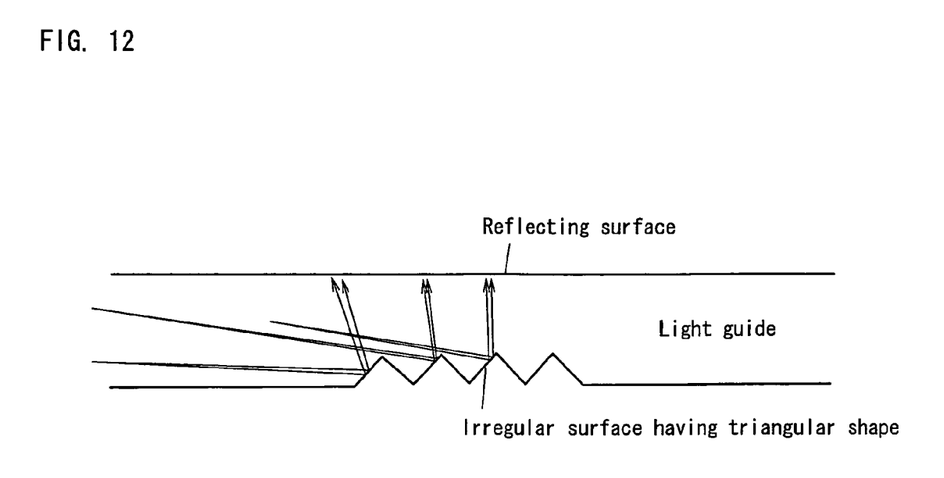
FIG. 12 is a view explaining light reflection by a conventional irregular surface having a triangular shape.

FIG. 12 is a view explaining light reflection in the case where an irregular surface having a triangular shape is formed as a light-reflecting portion. Light emitted from the light-emitting element such as an LED enters the inside of the light guide through the end surface of the light guide, and the light is reflected on the irregular surface so as to reach the light-emitting surface. If the light is incident on the light-emitting surface at a smaller angle than the total reflection angle, the light is transmitted through the light-emitting surface and emitted. If the light is incident on the light-emitting surface at a larger angle than the total reflection angle, the light returns back to the inside of the light guide.

In this instance, since the incident angle of light on the irregular surface is not uniform in the area close to the end where light enters, the reflection angle is not uniform either, whereby the intensity of emitted light is uniform to some extent. However, since the incident angle of light on the irregular surface becomes almost uniform in the area far from the end where light enters, the reflection angle also becomes almost uniform, whereby the intensity of emitted light becomes non-uniform.

SUMMARY OF THE INVENTION

In order to solve the above-mentioned drawbacks, according to the present invention, there is provided a light guide comprising tubular concave surfaces as a light-reflecting portion whose axes are perpendicular to the longitudinal axis of the light guide. According to the present invention, there is also provided a light guide comprising fine spherical concave surfaces as a light-reflecting portion.

With the provision of curved reflecting surfaces such as a spherical surface as a light-reflecting portion, even small displacement of the incident angle of light on the light-reflecting portion changes the reflection angle greatly, so that the intensity of emitted light can be uniform. In addition, by employing a light-reflecting portion rather than a light scattering portion, the direction of the reflected light can be controlled. Specifically, in the case of the light scattering pattern as disclosed in Patent Document 1, the luminous flux of light emitted from the light-emitting surface becomes wide when it is seen from the end surface of the light guide, and thereby the light amount becomes non-uniform. However, in the case of the tubular concave surfaces, the direction of emitted light can be controlled.

In particular, in a case where a flat surface is provided between the side surface and the bottom surface of a light guide by C-chamfering, the flat surface hardly ever serves as a reflecting surface with respect to the light-emitting surface. Therefore, preferably, the light-reflecting portion is provided in the bottom surface of a light guide, and the light-reflecting portion is concave surfaces having a cylinder shape or an elliptic cylinder shape to distribute the reflection angle in the main-scanning direction.

Also, in a case where both of the side surfaces of the light guide are formed as a curved surface whose curvature is getting greater toward the bottom surface, both of the side surfaces get to serve as a reflecting surface with respect to the light-emitting surface. Therefore, in this case, preferably, the light-reflecting portion provided on the bottom surface is spherical concave surfaces to distribute the reflection angle overall.

In the forming area of the light-reflecting portion, tubular concave surfaces are formed continuously along the longitudinal direction of the light guide, or fine spherical concave surfaces are formed continuously. If the width of the forming area of the light-reflecting portion is gradually reduced toward the end portion of the light guide on the light-emitting element side compared to the center portion of the light guide, or the forming area of the light-reflecting portion is includes a plurality of spaced parts or islands with progressively larger sizes moving away from the light-emitting element side, the light amount can be more uniform. Incidentally, the arrangement of the fine spherical concave surfaces may be dense; however, it is not limited to this.

A diffraction optical element such as a lens or a prism sheet for controlling the focal point of emitted light may be formed on the light-emitting surface of the light guide. A lens or a prism sheet for introducing light from the light-emitting unit into the light-reflecting portion may be formed on the end surface of the light guide. As for the above-mentioned lens, a convex lens, a concave lens, or a Fresnel lens may be used depending on the purpose. For example, a convex lens is used for condensing light, and a concave lens is used for expanding light.

In the line-illuminating device constructed of the light guide and the light-emitting unit, the light guide may be accommodated in a casing with a light-emitting unit such that the light-emitting surface is exposed, or a light-emitting unit may be directly attached to the end surface of the light guide. Light-emitting elements of three primary colors, i.e., red, green, and blue incorporated into the light-emitting unit may be positioned at the same distance from the centerline of the bottom surface of the light guide, or at the same distance from the bottom surface of the light guide. In addition, a reflecting means such as a reflector may be provided on the rear side of the light-emitting unit.

As another structure of the line-illuminating device, a light-emitting unit may be provided on both ends rather than only one end. Also, as an image-scanning device in which the line-illuminating device is incorporated, the present invention includes an image-scanning device in which only one line-illuminating device is incorporated or two line-illuminating devices are incorporated.

DETAILED DESCRIPTION OF THE PREFERRED EMBODIMENTS

Figure 1:
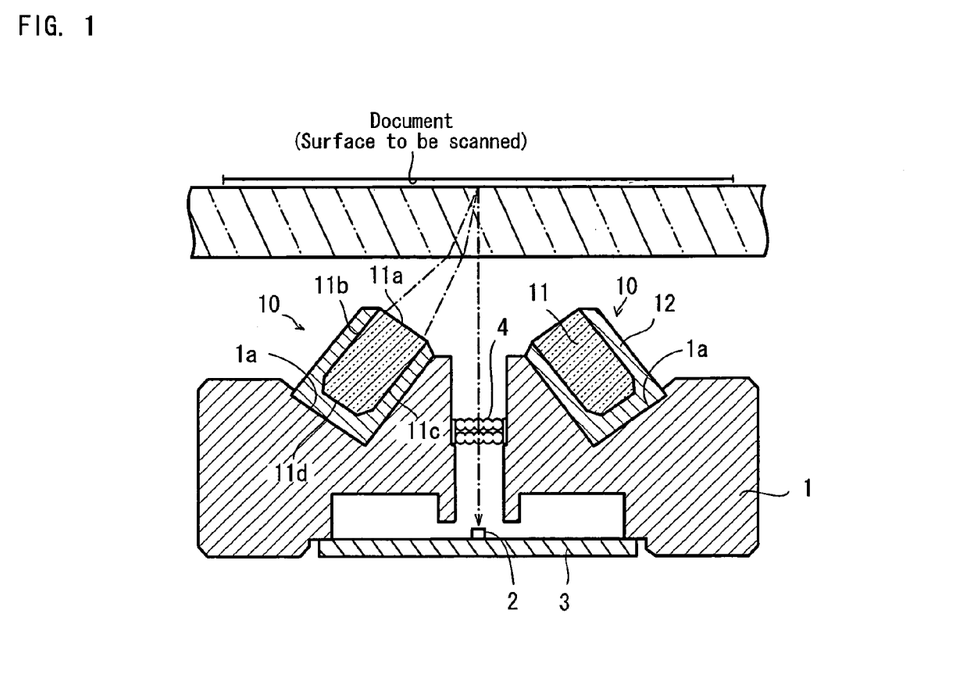
FIG. 1 is a cross-sectional view of an image-scanning device in which a light guide according to the present invention is incorporated as part of a line-illuminating device.
Figure 2:
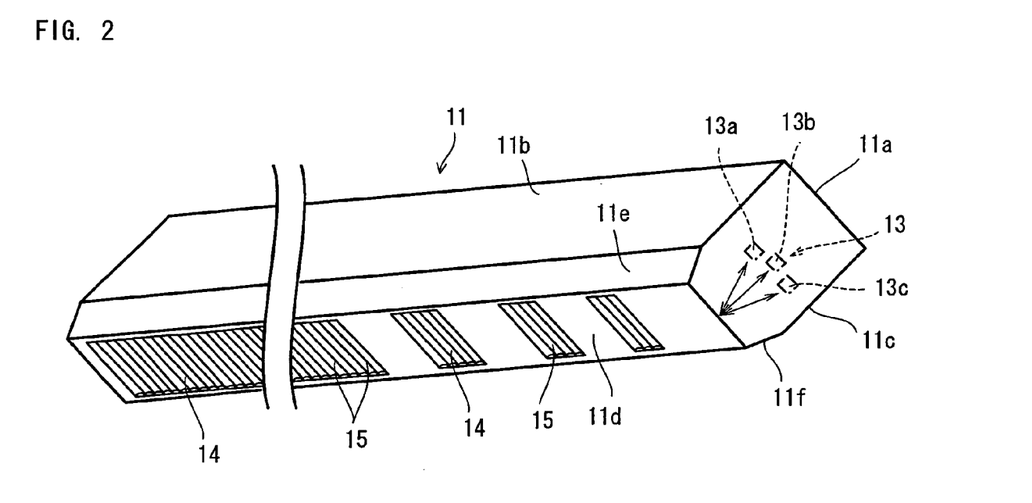
FIG. 2 is a perspective view of the light guide.

Preferred embodiments of the present invention will now be described with reference to the accompanying drawings. FIG. 1 is a cross-sectional view of an image-scanning device in which a light guide according to the present invention is incorporated as part of a line-illuminating device. FIG. 2 is a perspective view of the light guide.

An image-scanning device is comprised of two line-illuminating devices 10 and 10 provided in recessed portions 1a and 1a of a frame 1, a sensor substrate 3 having a photoelectric transducer element (line image sensor) 2 provided in the bottom, and a lens array 4 for a unit magnification system provided in the center of the frame 1 to condense light reflected from a document among light emitted from the line-illuminating devices 10 toward the photoelectric transducer element 2. Incidentally, a pair of line-illuminating devices 10 are provided in the embodiment shown in the drawing; however, it is also possible to provide only one line-illuminating device.

The lens array 4 is formed as an erecting unit magnification lens by layering a plurality of lens plates (two in the drawing). Each lens plate has a number of microlenses regularly arranged in a two-dimensional way at a predetermined pitch. With this structure of the lens array 4, it is possible to control the decrease of the light amount level caused by the displacement between the lens axis and the image sensor (receiving element), and prevent image distortion from being generated at the time of scanning a linear image. Incidentally, a rod-shaped lens may be used for the lens array 4.

The line-illuminating device 10 is comprised of a white casing 12, a bar-shaped or plate-shaped transparent light guide 11 made of acrylic resin which is housed within the white casing 12, and a light source unit 13 which is attached to one end of the white casing 12. Incidentally, since the light source unit 13 is attached to the white casing 12, it is shown with an imaginary line in FIG. 2. The light source unit 13 has LEDs 13a, 13b, and 13c of three primary colors, i.e., red, green, and blue. The LEDs 13a, 13b, and 13c are positioned at the same distance from the centerline of the bottom surface of the light guide 11 in a state where the light guide 11 is housed within the white casing 12. With this positioning, it is possible to control non-uniformity of the light intensity.

The LEDs 13a, 13b, and 13c may be positioned at the same distance from the bottom surface of the light guide 11. More specifically, the LEDs 13a, 13b, and 13c may be positioned such that the perpendiculars from the bottom surface to the LEDs 13a, 13b, and 13c are equal to each other.

The shape of the end surface of the light guide 11 is hexangular. Specifically, the peripheral surfaces of the light guide are constructed of an upper surface 11a to serve as a light-emitting surface, both side surfaces 11b and 11c, a bottom surface 11d, and flat portions 11e and 11f which are formed by C-chamfering between both of the side surfaces and the bottom surface.

All of the above-mentioned peripheral surfaces of the light guide 11 are flat surface. A light-reflecting portion 14 is formed on the bottom surface 11d so as distribute light from the end surface uniformly in the longitudinal direction. By arranging the forming area of the light-reflecting portion only on parts of the forming area in progressively larger island shapes moving away from the light source unit 13, the light intensity in the main-scanning direction becomes uniform.

Figure 3:
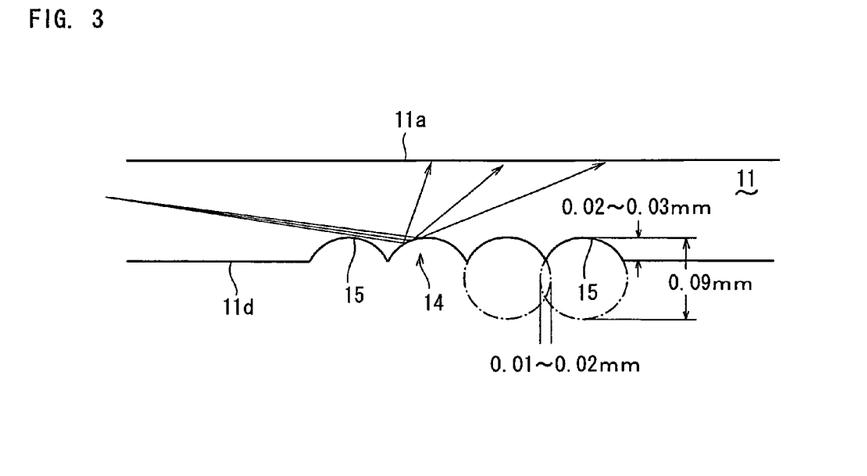
FIG. 3 is a view explaining the function of a line-illuminating device in which a light guide according to the present invention is incorporated.

Each of the forming areas of the light-reflecting portion is comprised of plural tubular concave surfaces 15. The axis of the tubular concave surface 15 is perpendicular to the longitudinal direction (main-scanning direction) of the light guide. As shown in FIG. 3, the cross-sectional shape of the tubular concave surface is an arc having a depth of 0.02–0.03 mm which is obtained by superposing circles having a diameter of 0.09 mm in the range of 0.01–0.02 mm. Thus, the depth of the arc is smaller than the radius of the circle.

The light-reflecting portion 14 comprised of the tubular concave surfaces 15 becomes a reflecting surface having tubular convex surfaces when it is seen from the inside of the light guide 11. As shown in FIG. 3, even when the incident angle of light from the light source unit 13 slightly displaces, the reflection angle in the tubular convex surfaces significantly changes. In a conventional irregular surface having a triangular shape as mentioned above, the incident angle becomes almost uniform in the area far from the light source unit, and thereby the reflection angle also becomes uniform. Consequently, it is difficult to achieve uniform reflection in the main-scanning direction. However, in this embodiment with the tubular concave surfaces 15, light is reflected uniformly toward the upper surface 11a as a light-emitting surface.

In the embodiment as shown in the drawing, the shape of the tubular concave surface 15 is part of an arc. However, it may be part of an elliptic arc or a combination thereof.

Figure 4:
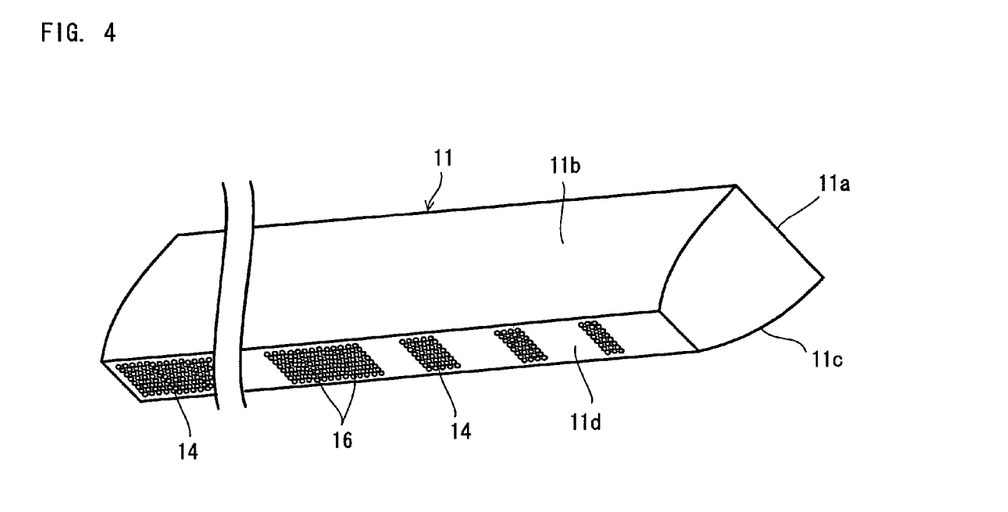
FIG. 4 is a perspective view showing another embodiment of the light guide.
Figure 5:
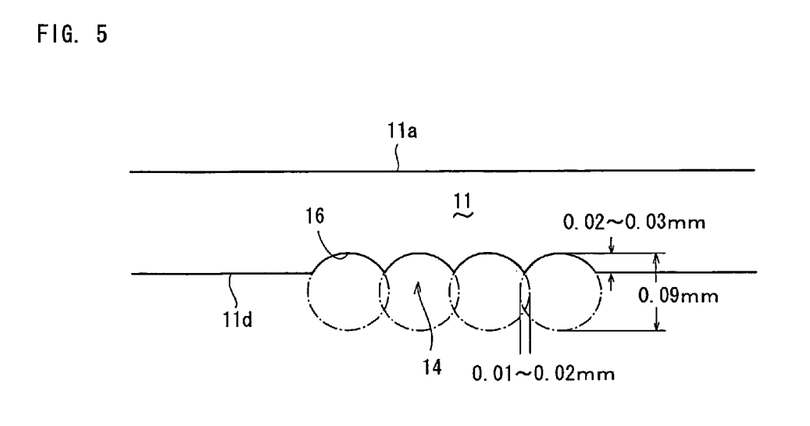
FIG. 5 is an enlarged view of FIG. 4.

FIG. 4 is a perspective view showing another embodiment (Embodiment 2) of the light guide, and FIG. 5 is an enlarged view of a portion of FIG. 4. In this embodiment, each of the forming areas of the light-reflecting portion 14 is comprised of fine spherical concave surfaces 16 which are formed densely and continuously, and both of the side surfaces 11b and 11c are formed as a curved surface. As for the curved surface, an elliptic surface or a parabolic surface may be possible, and the curvature may be different between both of the side surfaces so as to increase the depth of focus.

The cross-sectional shape of the spherical concave surface 16 is an arc having a depth of 0.02–0.03 mm which is obtained by superposing circles having a diameter of 0.09 mm in the range of 0.01–0.02 mm in the same manner as the tubular concave surface 15. Again, the depth of the arc is smaller than the radius of the circle.

In the case of using the fine spherical concave surface 16 as the light-reflecting portion 14, light from the end surface is reflected toward both of the side surfaces 11b and 11c as well as the upper surface 11a as a light-emitting surface. Therefore, both of the side surfaces 11b and 11c should be a curved surface rather than a flat surface such as Embodiment 1, so that both of the side surfaces 11b and 11c can serve as a reflecting surface.

Figure 6:
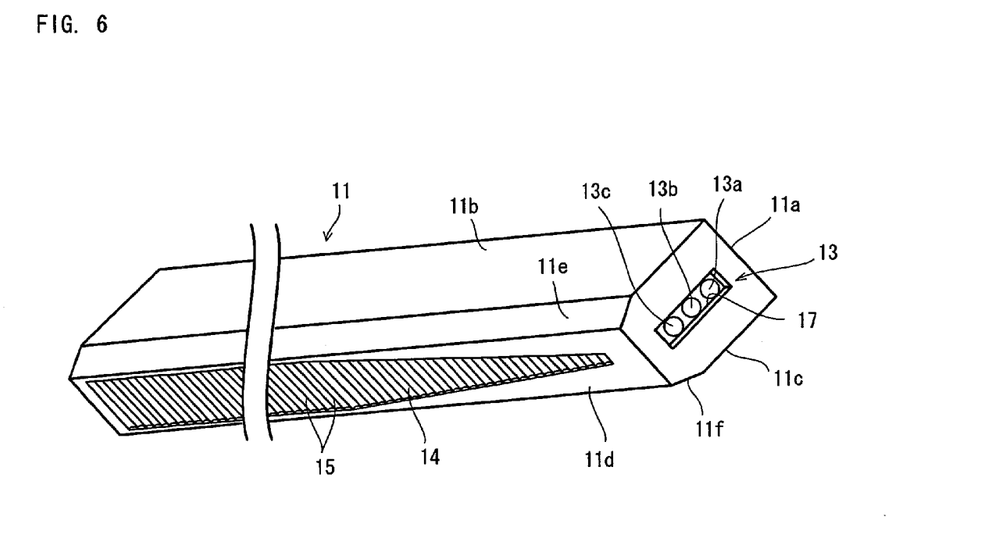
FIG. 6 is a perspective view showing another embodiment of the light guide.

FIG. 6 is a perspective view showing another embodiment of the light guide. In this embodiment, tubular concave surfaces 15 are formed continuously in the main-scanning direction to form the light-reflecting portion 14, and the width is reduced on the side of the light source unit 13, so that the amount of reflected light can be uniform.

Also, in the embodiment shown in FIG. 6, a recessed portion 17 is provided in the end surface of the light guide 11, and the light source unit 13 is set in the recessed portion 17. As a result of this, the line-illuminating device 11 can be constructed without a casing in this embodiment. Incidentally, in the case of using the spherical concave surfaces 16 as the light-reflecting portion 14, the same embodiment as shown in FIG. 6 is possible.

Figure 7:
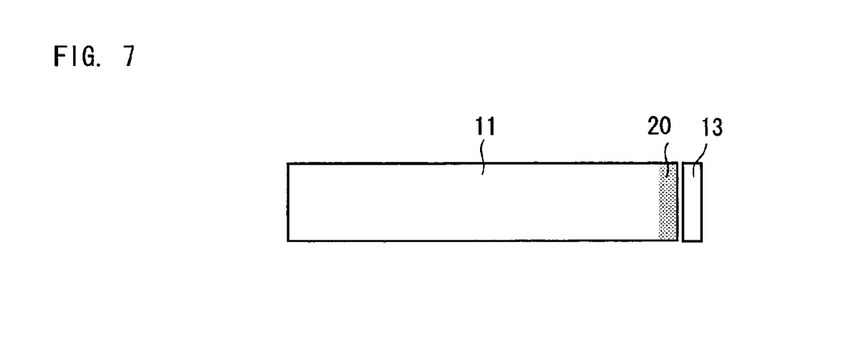
FIG. 7 is a view showing another embodiment of the line-illuminating device.

FIG. 7 is a view showing another embodiment of the line-illuminating device. In this embodiment, a convex lens 20 or a prism sheet is formed on the end surface of the light guide 11 which faces the light source unit 13 so as to introduce light from the light-emitting unit 13 into the light-reflecting portion 14.

Figure 8:
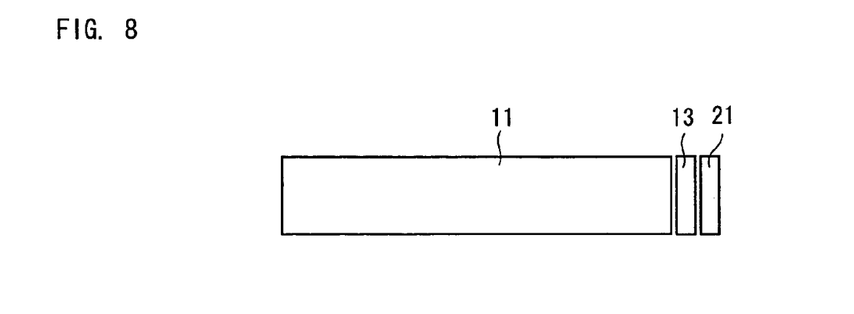
FIG. 8 is a view showing another embodiment of the line-illuminating device.

FIG. 8 is a view showing another embodiment of the line-illuminating device. In this embodiment, a reflector 21 is provided on the rear side of the light source unit 13 so as to introduce all the light emitted from the light source unit 13 into the light guide 11.

Figure 9:
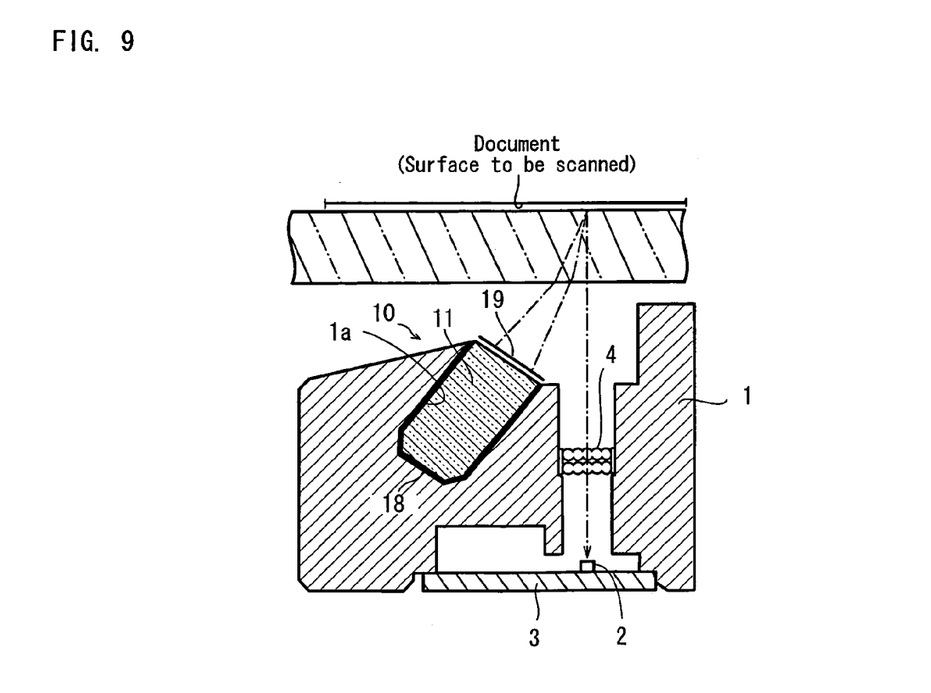
FIG. 9 is a cross-sectional view of another embodiment of the image-scanning device.

FIG. 9 is a cross-sectional view of another embodiment of the image-scanning device. This embodiment uses the line-illuminating device 10 shown in FIG. 6, and the line-illuminating device 10 is directly fixed to a recessed portion 1a which is formed in a frame 1.

Also, in this embodiment, a reflecting sheet 18 is attached to the bottom surface 11d of the light guide 11 so as to improve the reflecting efficiency, and a prism sheet 19 is attached to the upper surface 11a as a light-emitting surface so as to control the direction of reflected light.

Figure 10:
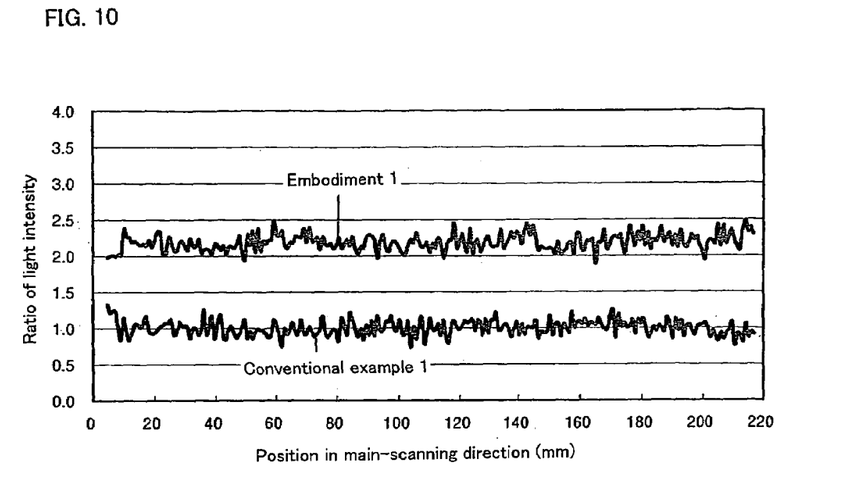
FIG. 10 is a graph showing the ratio of the light intensity in the main-scanning direction between the light guide according to Embodiment 1 and a conventional light guide.
Figure 11:
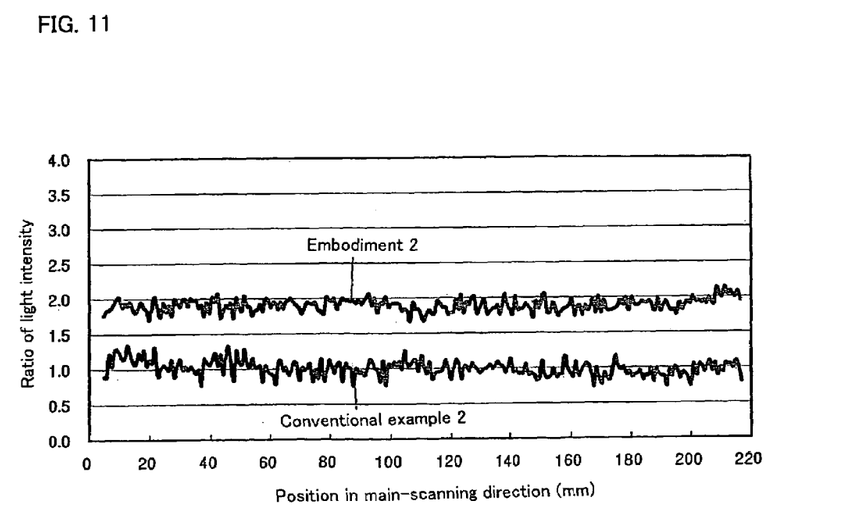
FIG. 11 is a graph showing the ratio of the light intensity in the main-scanning direction between the light guide according to Embodiment 2 and a conventional light guide.

FIGS. 10 and 11 are a graph showing the ratio of the light intensity in the main-scanning direction between the light guide according to Embodiment 1, 2 and a conventional light guide. Conventional Example 1 uses white paint as a light-reflecting portion in the light guide shown in FIG. 2, and Conventional Example 2 uses white paint as a light-reflecting portion in the light guide shown in FIG. 4. As clearly shown in these graphs, the ratio of the light intensity can be improved greatly in the light guide according to the present invention compared to the conventional light guide.

According to the present invention, since the light-reflecting portion can be formed unitarily with the light guide, it is possible to easily manufacture at a low cost compared to pattern printing by a silk-screen printing method.

According to the present invention, it is also possible to make the intensity of emitted light uniform in the main-scanning direction (the longitudinal direction of the light guide), reduce the non-uniformity of the light amount, and solve the problem of insufficient light amount.

The line-illuminating device and the image-scanning device according to the present invention can be used effectively as a copying machine, a facsimile machine, or the like.

Although there have been described what are the present embodiments of the invention, it will be understood that variations and modifications may be made thereto within the spirit and scope of the invention as reflected by the appended claims.

What is claimed is:

1. A light guide having a bar shape or a plate shape in which light introduced from an end surface of the light guide is reflected on a light-reflecting portion provided on a bottom surface of the light guide and emitted from a light-emitting surface of the light guide, wherein the light-reflecting portion is comprised of a plurality of contacting tubular concave surfaces in a longitudinal direction of the light guide and axes of the tubular concave surfaces are perpendicular to the longitudinal direction of the light guide, and the cross-sectional shape of the tubular concave surfaces is an arc obtained by superposing circles, the depth of the arc being smaller than the radius of the circle.

2. The light guide according to claim 1, wherein flat portions are formed between both side surfaces and the bottom surface of the light guide by C-chamfering.

3. The light guide according to claim 2, wherein a forming area of the tubular concave surfaces includes at least one of a width which is gradually reduced toward at least one end portion of the light guide compared to a center portion of the light guide, and wherein the tubular concave surfaces are formed only on parts of the forming area.

4. The light guide according to claim 1, wherein a forming area of the tubular concave surfaces includes at least one of a width which is gradually reduced toward at least one end portion of the light guide compared to a center portion of the light guide, and the plurality of contacting tubular concave surfaces are formed only on parts of the forming area.

5. A light guide having a bar shape or a plate shape in which light introduced from an end surface of the light guide is reflected on a light-reflecting portion on a bottom surface of the light guide and emitted from a light-emitting surface of the light guide, wherein the light-reflecting portion is comprised of a plurality of contacting fine spherical concave surfaces, and the cross-sectional shape of the fine spherical concave surfaces is an arc obtained by superposing circles, the depth of the arc being smaller than the radius of the circle.

6. The light guide according to claim 5, wherein both side surfaces of the light guide are curved with a curvature that increases toward the bottom surface of the light guide.

7. The light guide according to claim 6, wherein a forming area of the fine spherical concave surfaces includes at least one of a width which is gradually reduced toward at least one end portion of the light guide compared to a center portion of the light guide, and wherein the fine spherical concave surfaces are formed only on parts of the forming area.

8. The light guide according to claim 5, wherein a forming area of the fine spherical concave surfaces includes at least one of a width which is gradually reduced toward at least one end portion of the light guide compared to a center portion of the light guide, and the plurality of contacting fine spherical concave surfaces are formed only on parts of the forming area.

9. A line-illuminating device, comprising the light guide according to claim 1 accommodated in a casing with a light-emitting unit such that the light-emitting surface is exposed.

10. The line-illuminating device according to claim 9, wherein the light-emitting unit is comprised of light-emitting elements of three primary colors including red, green, and blue, and the light-emitting elements are positioned at the same distance from centerline of the bottom surface of the light guide.

11. The line-illuminating device according to claim 9, wherein the light-emitting unit is comprised of light-emitting elements of three primary colors including red, green, and blue, and the light-emitting elements are positioned at the same distance from the bottom surface of the light guide.

12. The line-illuminating device according to claim 9, further comprising a reflector provided on the rear side of the light-emitting unit.

13. A line-illuminating device comprising the light guide according to claim 1 and a light-emitting unit directly attached to at least one end surface of the light guide.

14. An image-scanning device comprising the line-illuminating device according to claim 9, a line image sensor comprising a photoelectric transducer element, and a lens array for condensing light reflected from a document among light emitted from the line-illuminating device toward the line image sensor.

15. A line-illuminating device, comprising the light guide according to claim 5 accommodated in a casing with a light-emitting unit such that the light-emitting surface is exposed.

16. A line-illuminating device comprising the light guide according to claim 5 and a light-emitting unit directly attached to at least one end surface of the light guide.

17. The line-illuminating device according to claim 13, wherein the light-emitting unit is comprised of light-emitting elements of three primary colors including red, green, and blue, and the light-emitting elements are positioned at the same distance from a centerline of the bottom surface of the light guide.

18. The line-illuminating device according to claim 13, wherein the light-emitting unit is comprised of light-emitting elements of three primary colors including red, green, and blue, and the light-emitting elements are positioned at the same distance from the bottom surface of the light guide.

19. The line-illuminating device according to claim 13, further comprising a reflector provided on the rear side of the light-emitting unit.

20. An image-scanning device comprising the line-illuminating device according to claim 13, a line image sensor comprising a photoelectric transducer element, and a lens array for condensing light reflected from a document among light emitted from the line-illuminating device toward the line image sensor.

* * * * *

UNITED STATES PATENT AND TRADEMARK OFFICE
CERTIFICATE OF CORRECTION

PATENT NO.         : 7,076,148 B2
APPLICATION NO. : 11/137692
DATED                  : July 11, 2006
INVENTOR(S)        : Nemoto et al.

It is certified that error appears in the above-identified patent and that said Letters Patent is hereby corrected as shown below:

Column 1:
    Line 25, change "light scat-" to --light-scat- --.
    Lines 27, 29, 32, and 38, change "light scattering" to --light-scattering--.

Column 2:
    Lines 25-26, change "light scattering" to --light-scattering--.
    Line 27, change "light scattering" to --light-scattering--.
    Line 59, change "is includes a plurality" to --includes a plurality--.

Column 4:
    Line 53, change "are flat surface." to --are flat surfaces.--.
    Line 54, change "so as distribute" to --so as to distribute--.
    Line 61, change "portion is" to --portion 14 is--.
    Line 66, change "concave surface is" to --concave surface 15 is--.

Column 6:
    Line 16, change "Embodiment 1, 2" to --Embodiments 1, 2--.

Column77:
    Line 5, change "portion on a" to --portion provided on a--.
    Line 38, change "distance from centerline" to --distance from a centerline--.

Column 8:
    Line 4, change "device comprising" to --device, comprising--.

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,076,148 B2  
APPLICATION NO. : 11/137692  
DATED : July 11, 2006  
INVENTOR(S) : Nemoto et al.

Page 1 of 1

It is certified that error appears in the above-identified patent and that said Letters Patent is hereby corrected as shown below:

Column 1:
    Line 25, change "light scat-" to --light-scat- --.
    Lines 27, 29, 32, and 38, change "light scattering" to --light-scattering--.

Column 2:
    Lines 25-26, change "light scattering" to --light-scattering--.
    Line 27, change "light scattering" to --light-scattering--.
    Line 59, change "is includes a plurality" to --includes a plurality--.

Column 4:
    Line 53, change "are flat surface." to --are flat surfaces.--.
    Line 54, change "so as distribute" to --so as to distribute--.
    Line 61, change "portion is" to --portion 14 is--.
    Line 66, change "concave surface is" to --concave surface 15 is--.

Column 6:
    Line 16, change "Embodiment 1, 2" to --Embodiments 1, 2--.

Column 7:
    Line 5, change "portion on a" to --portion provided on a--.
    Line 38, change "distance from centerline" to --distance from a centerline--.

Column 8:
    Line 4, change "device comprising" to --device, comprising--.

This certificate supersedes Certificate of Correction issued November 21, 2006.

Signed and Sealed this

Sixteenth Day of October, 2007

JON W. DUDAS  
*Director of the United States Patent and Trademark Office*